June 12, 1962  A. J. SMIALOWSKI ET AL  3,038,259
BLOOD VESSEL SIZE MEASURING INSTRUMENT
Filed July 8, 1960
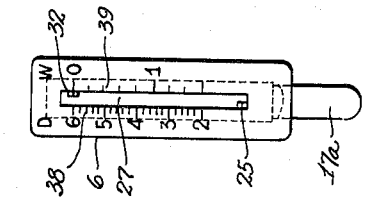
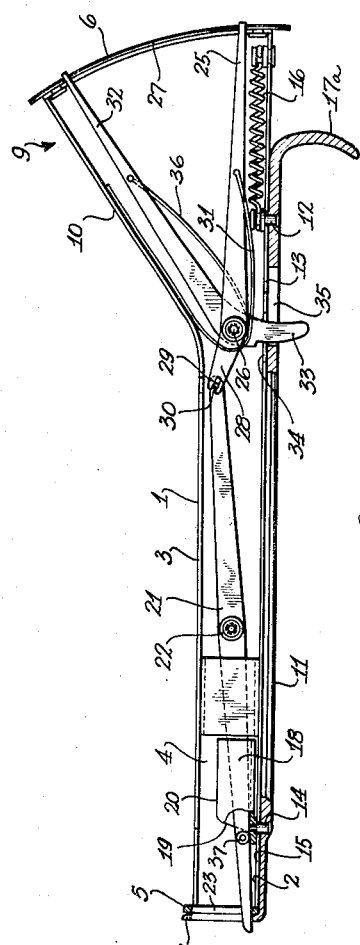
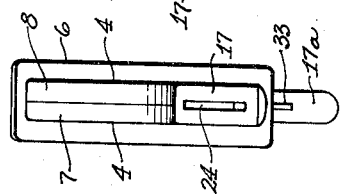
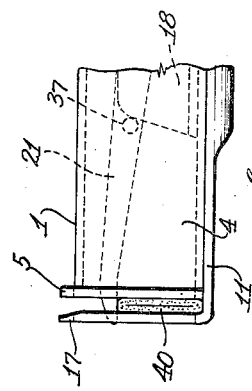
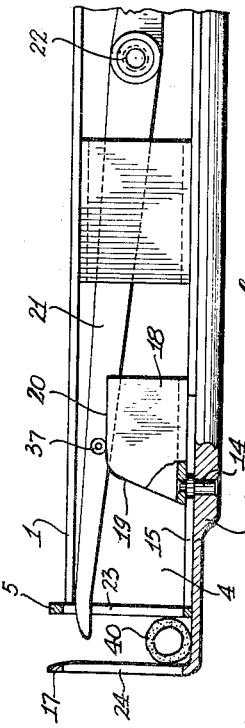
INVENTOR
Antoni J. Smialowski
Isaac J. Vogelfanger
Christoph L. Fischer
Sidney H. G. Connock
BY
Alex. E. MacRae
ATTORNEY United States Patent Office 3,038,259
Patented June 12, 1962

3,038,259
BLOOD VESSEL SIZE MEASURING INSTRUMENT
Antoni J. Smialowski and Isaac J. Vogelfanger, Ottawa, Ontario, Christoph L. Fischer, Eastview, Ontario, and Sidney H. G. Connock, Ottawa, Ontario, Canada, assignors to Canadian Patents and Development Limited, Ottawa, Ontario, Canada
Filed July 8, 1960, Ser. No. 41,569
4 Claims. (Cl. 33—149)

This invention relates to a measuring instrument or gauge.

It is frequently desirable to ascertain the diameter sizes of flexible tubular elements such as blood vessels. For instance, in the use of suturing apparatus such as is disclosed in copending application Serial No. 717,656, filed February 26, 1958, now Patent No. 2,940,451, it is quite advantageous to ascertain the diameter of the blood vessel to be sutured in order that the surgeon may select the proper size of bushings to be employed in the suturing operation. Obviously, the measurement of small highly flexible tubular elements such as blood vessels presents difficult problems, particularly since such measurement must be effected in a very rapid manner in order that the suturing operation may be quickly completed with as little adverse effect as possible on the patient.

It is an object of this invention to provide an instrument for measuring the diameter of tubular bodies which is of simple structure, which is convenient to employ, and which provides an accurate, positive and rapid reading.

Another object is to provide an instrument for measuring the diameter of tubular bodies which includes means for collapsing the body to be measured, means for indicating the wall thickness of the collapsed body, and means for indicating the diameters of the body.

The invention will be described with reference to the accompanying drawing, in which:

FIGURE 1 is a sectional side elevation of an instrument in accordance with the invention,
FIGURE 2 is one end elevation,
FIGURE 3 is another end elevation,
FIGURE 4 is an enlarged partial side elevation showing one position of the instrument, and
FIGURE 5 is an enlarged partial side elevation showing another position of the instrument.

The measuring instrument illustrated comprises an elongated rectangular housing 1 having a bottom wall 2, a top wall 3, side walls 4, a rear end wall 5, and a forward end wall 6. For convenience of manufacture and assembly, the housing may be formed in two substantially identical parts 7 and 8, each including portions of walls 2, 3 and 4, rear wall 5 and forward wall 6 being suitably fixed thereto. The forward portion 9 of the housing is enlarged by an outwardly inclined section 10 of the top wall 3 and complementary extensions of the side walls 4. Preferably, the forward wall 6 is of arcuate form as shown.

A bar 11 is slidably mounted on the bottom wall 2 of the housing and exteriorly thereof as by means of a pin 12 fixed to the bar adjacent the forward end thereof and extending through a slot 13 in the bottom wall 2 and a pin 14 fixed to the bar adjacent the rearward end thereof and extending through a slot 15 in the bottom wall 2. A spring 16 mounted in the housing and connected to the pin 12 urges the bar in a forward direction. The rearward end of the bar is provided with a perpendicular flange 17 which normally abuts the rear wall 5 under the influence of the spring 16. The forward end of the bar is provided with a manipulating handle 17a. Fixed to pin 14 within the housing is a cam member 18 which, therefore, is slidable with the bar. The cam member 18 has a rearward inclined cam surface 19 and a contiguous cam surface 20 which is in generally parallel relation with the bar.

An arm 21 is pivoted at 22 intermediate its ends within the housing between side walls 4 and about a pivotal axis substantially perpendicular to said side walls. The rearward end of arm 21 projects through a slot 23 in the rear wall 5 and also through a complementary slot 24 in flange 17 of the bar when such flange is in abutting relation to end wall 5.

An indicator pointer 25 is pivoted at 26 within the housing between side walls 4 and also about a pivotal axis substantially perpendicular to said side walls. The pointer extends forwardly of such pivot through the forward portion 9 of the housing and the forward end thereof projects into a slot 27 in the forward wall 6. The pointer has a short arm 28 extending rearwardly of pivot 26. Arm 28 has a forked end 29 embracing a pin 30 on the forward end of arm 21. It will be apparent that oscillating movement of arm 21 will impart reverse oscillating movement to the pointer 25 through the pin and fork connection 29, 30. A spring 31 connected to pointer 25 urges the pointer in a downward direction or towards bottom wall 2.

A second indicator pointer 32 is also pivotally mounted on pivot 26. Pointer 32 has a short arm 33 extending downwardly from pivot 26 and through a slot 34 in the bottom wall 2 and a complementary slot 35 in the bar 11. A spring 36 connected to pointer 32 urges the pointer also in a downward direction towards botom wall 2. The forward end pointer 32 extends into slot 27 in the forward wall 6.

It will be apparent that, in the at rest position of the parts of the instrument described, the end of pointer 32 will be disposed at the upper end of slot 27 by reason of engagement of arm 33 with the end of slot 35 in the bar and the end of pointer 25 will be disposed at the lower end of slot 27. A roller or like cam follower 37 is mounted on the rearward portion of arm 21 and in the at rest position described is located in engagement with the base portion of cam surface 19.

It will be apparent that, on rearward sliding movement of bar 11 and cam member 18, roller 37 will move upwardly along cam surface 19 and then along cam surface 20. Thus, the rearward portion of arm 21 will swing upwardly, the forward portion thereof will swing downwardly, and consequently the pointer 25 will swing upwardly. Such rearward sliding movement of the bar 11 will also move the end of slot 35 rearwardly, and the pointer 32 will swing downwardly under the influence of its spring 36.

A diameter indicating scale 38 is provided on the outer surface of forward wall 6 on one side of slot 27 for co-operation with the end of pointer 25. A wall thickness indicating scale 39 is provided on the outer surface of forward wall 6 on the other side of slot 27 for cooperation with the end of pointer 32.

In operation, the bar 11 is manually reciprocated in a rearward direction against its spring 16 whereby a blood vessel 40 or other tubular member may be interposed between the flange 17 and the rear wall 5, as indicated in FIGURE 4. The bar 11 is then released for forward reciprocating movement under the influence of spring 16 which movement collapses the blood vessel between the flange 17 and rear wall 5, as shown in FIGURE 5. The rearward end of arm 21 will come to rest in abutting relation with one edge of the collapsed vessel, the other edge thereof being in engagement with bar 11. Thus, the pointer 25 will provide a diameter indication on the scale 38. The thickness of the collapsed vessel is indicated by the space between the inner surfaces of flange 17 and rear wall 5 and is translated into a thickness indication on scale 39 by pointer 32.

By suitable calculation of the scale indications of scales 38 and 39 indicated as D and W, respectively, the outside diameter of the vessel will be the reading of D plus the reading of W, and the inside diameter of the vessel will be the reading of D minus the reading of W, D being a mean diameter of the vessel.

It will thus be apparent that the measuring operation may be performed in a convenient, rapid and accurate manner.

We claim:
1. A measuring instrument comprising a housing having rear, forward, top, bottom, and side walls, an arm pivotally mounted in said housing between said side walls, a first pointer pivotally mounted in said housing and having an articulated connection with said arm for swinging movement in response to swinging movement of said arm, a second pointer pivotally mounted in said housing, a bar slidably mounted on said bottom wall exteriorly of said housing, and having a slot therein, said bottom wall having a slot in partial registry with said bar slot, said second pointer having an arm extending through said slots, a cam member having a cam surface in said housing and fixed to said bar for sliding movement therewith, a cam follower engaging said cam surface carried by said first arm, said bar having an end flange engageable with the outer surface of said rear wall, said flange and rear wall having slots therein for passage therethrough of the rear end of said first arm, said forward wall having a slot therein for reception of the ends of said pointers, a spring connected to said bar and urging said flange into engagement with said rear wall, and a spring connected to each of said pointers and urging said pointers towards said bottom wall.

2. A measuring instrument comprising a housing having bottom and side walls, a rear wall between said side walls, and a forward end opening, an arm pivotally mounted in said housing between said side walls, a first pointer pivotally mounted in said housing and having an articulated connection with said arm for swinging movement in response to swinging movement of said arm, a second pointer pivotally mounted in said housing, a bar slidably mounted on said bottom wall and having a slot therein, said bottom wall having a slot in partial registry with said bar slot, said second pointer having an arm extending through said slots, a cam member having a cam surface in said housing and fixed to said bar for sliding movement therewith, a cam follower engaging said cam surface carried by said first arm, said bar having an end flange engageable with the outer surface of said rear wall, said flange and rear wall having slots therein for passage therethrough, of the rear end of said first arm, the ends of said pointers extending through said forward end opening, a spring connected to said bar and urging said flange into engagement with said rear wall, and a spring connected to each of said pointers and urging said pointers towards said bottom wall.

3. A measuring instrument as defined in claim 2, said pointers having a common pivot, said bar having an edge defining one end of said slot therein, said second pointer arm being in engagement with said bar edge.

4. A measuring instrument as defined in claim 2, said bar having an edge defining one end of said slot therein, said second pointer arm being in engagement with said bar edge, said first arm and pointers having an "at rest" position defined by engagement of said flange and said rear wall, said rear arm of said first arm being swingable away from said bottom wall in response to travelling movement of said cam follower on said cam surface pursuant to sliding movement of said bar to separate said flange from said rear wall.

References Cited in the file of this patent
FOREIGN PATENTS
448,049     Great Britain _____ June 2, 1936